No. 707,785. Patented Aug. 26, 1902.
P. KLEBER.
FASTENING DEVICE.
(Application filed Nov. 27, 1901.)
(No Model.) 2 Sheets—Sheet 1.
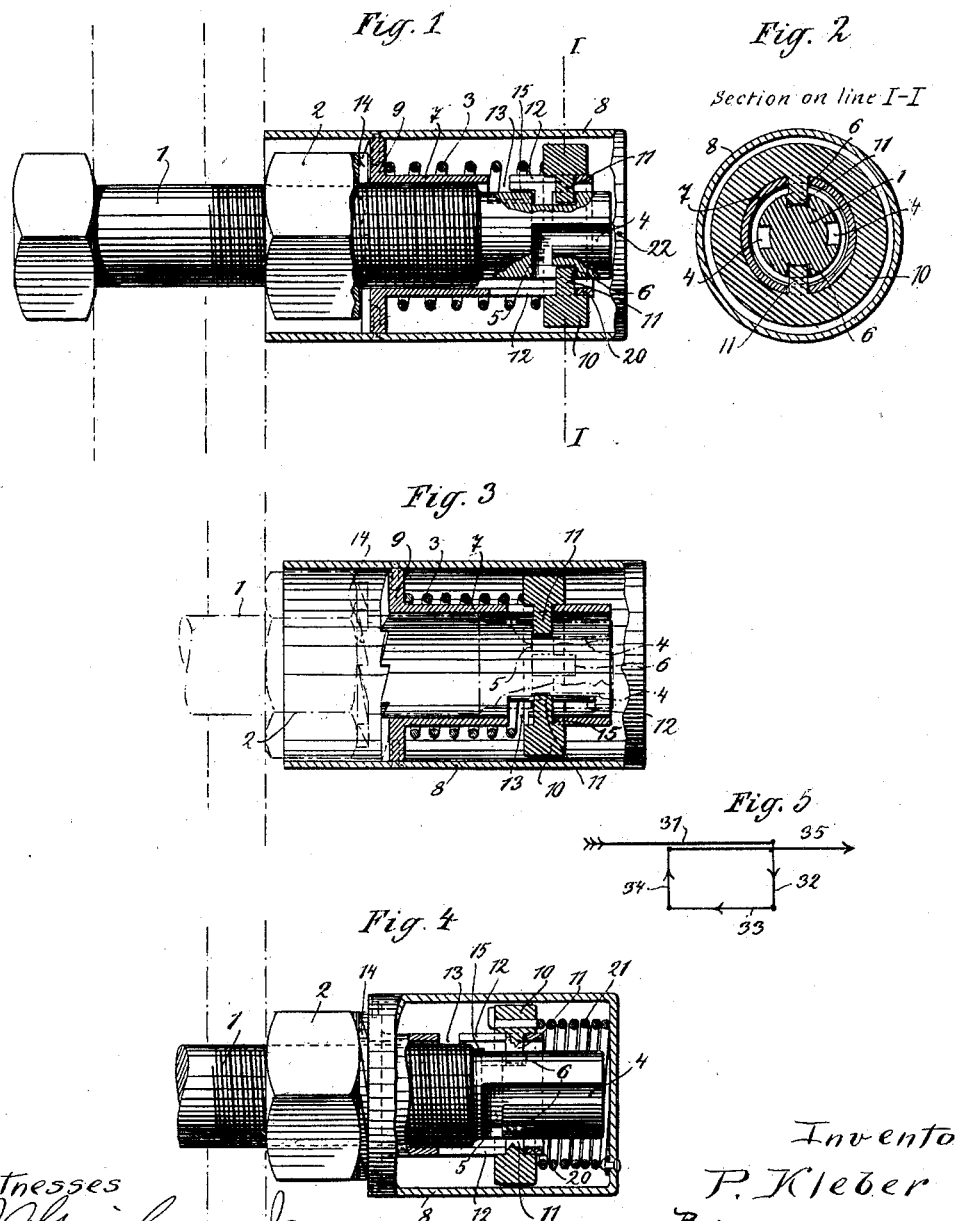
Witnesses
J. A. Griesbauer
J. A. Willson
Inventor
P. Kleber
By
H. D. Willson & Co,
Attorneys No. 707,785. Patented Aug. 26, 1902.
P. KLEBER.
FASTENING DEVICE.
(Application filed Nov. 27, 1901.)
(No Model.)
2 Sheets—Sheet 2.

Witnesses
J. Griesbauer Jr.
J. B. Willson

Inventor
P. Kleber
By
H. B. Willson & Co.
Attorneys

UNITED STATES PATENT OFFICE.

PETER KLEBER, OF WIESBADEN, GERMANY.

FASTENING DEVICE.

SPECIFICATION forming part of Letters Patent No. 707,785, dated August 26, 1902.

Application filed November 27, 1901. Serial No. 83,918. (No model.)

*To all whom it may concern:*

Be it known that I, PETER KLEBER, director, a subject of the King of Prussia and Emperor of Germany, residing at 80 Kaiser Friedrichs Ring, Wiesbaden, in the Kingdom of Prussia and Empire of Germany, have invented certain new and useful Improvements in Fastening Devices, of which the following is a full, clear, and exact description.

The object of the present invention is an improved fastening device by which a secure yet easily-detachable connection of articles of different kinds is enabled.

In the accompanying drawings this invention is represented in Figures 1 to 7.

Figure 6:
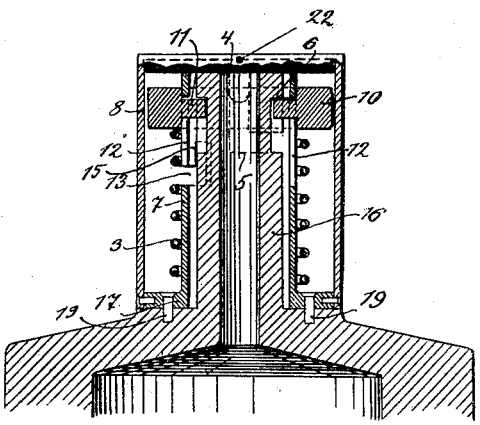
Figure 7:
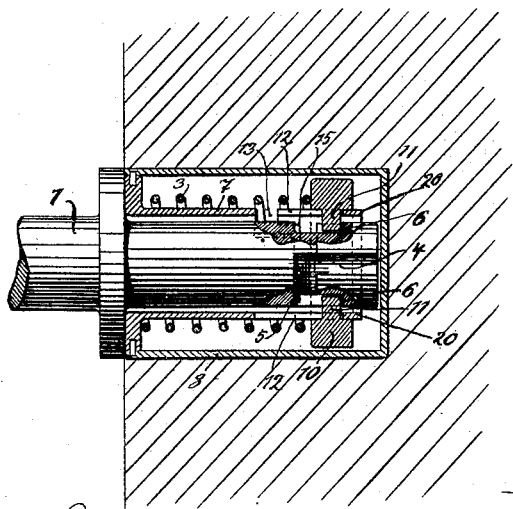

Fig. 1 is a longitudinal section of the fastening device adapted to secure a bolt in its place. Fig. 2 is a section on line I I of Fig. 1. Fig. 3 shows the fastening device when partly disengaged. Fig. 4 is a modified form of the device. Fig. 5 is a diagram. Figs. 6 and 7 show different applications of the device.

In Fig. 1 the numeral 1 designates a bolt adapted to hold together by a nut 2 the two parts marked in dotted lines—for instance, a fish-joint. In bolt 1 there are provided two bayonet-slots having each a longitudinal part 4 open at the end of the bolt, a circumferential part 5, and a rest 6. In the sleeve 7, surrounding the bolt 1, there are two corresponding bayonet-slots having each a longitudinal part 12, a circumferential part 13, opposite in direction to slots 5, and a rest 15. On sleeve 7 there is slidingly arranged a ring 10, having two noses 11, entering the respective bayonet-slots of sleeve 7 and projecting inwardly in order to engage also the bayonet-slots in the bolt 1. Surrounding sleeve 7 there is a spring 3, resting at one end against the ring 10 and at the other against the toothed disk 9, adapted to engage the corresponding teeth 14 of the nut 2. After spring 3 and ring 10 have been mounted on sleeve 7 the open ends of slots 12 may be closed by a piece 20, to be held in place by means of solder or in any other suitable manner, so that parts 3 and 10 cannot be disengaged from sleeve 7. In order to inclose this whole mechanism and to secure it against damage of any kind, there may be provided a sleeve or casing 8, loosely surrounding sleeve 7 or firmly connected therewith by means of pins, screws, or in any other suitable way.

In the modification shown in Fig. 4 the pressure-spring 3 is replaced by a tension-spring 21, arranged between ring 10 on the one hand and the back end of casing 8 on the other. Besides, the casing 8 in this instance extends only as far as disk 9, so that the nut 2 may still be turned after the fastening device has been secured in its place.

The function of the described device will be easily understood by means of the diagram, Fig. 5, showing the consecutive directions in which the sleeve 8 (or a certain point of this sleeve—for instance, the point 22) must be moved in order to detach the device from the bolt 1, Fig. 1.

First, the sleeve 8 is drawn backward, line 31, Fig. 5, (compressing spring 3,) until the circumferential slots 13 are opposite to the noses 11, resting in the rests 6.

Second, sleeve 8 is turned in the direction of line 32 until the noses 11 reach the end of the circumferential slots 13.

Third, sleeve 8 is moved forward, line 33. During the first part of this motion the noses 11 enter the rest 15 and assume the position shown in Fig. 4 relatively to these rests. During the second part of the said motion on line 33 the noses 11 are moved forward relatively to bolt 1 until they have left the rests 6 and stand opposite to the circumferential slots 5.

Fourth, the sleeve 8 is turned in the direction of line 34 until the noses 11 have passed the slots 5 and stand opposite to slots 4.

Fifth, the sleeve 8 is drawn backward in the direction of line 35, noses 11 passing through slots 4, so that the device is now detached, parts 3 7 9 10 assuming now the position Fig. 3 relatively to each other.

In order to bring the detached parts into engagement again with bolt 1 and nut 2, said parts must assume the position Fig. 3, in which case the engagement is easily effected by moving the sleeve 8 in the consecutive directions 35 34 33 32 31—*i. e.*, in a sense exactly reverse to the motions made for the purpose of detachment.

The working of the modification shown in Fig. 4 is exactly the same as in the foregoing construction.

In Fig. 6 the fastening device is shown as applied to close the end of a tube 16. The construction and working are essentially the same as in Figs. 1 to 3, slight differences only existing with relation to the following details: The toothed disk 9, Fig. 1, is replaced by a disk 17, engaging by pins 19 the enlarged body of part 16 in order to prevent an unintended rotation. At the bottom of the casing 8, which is firmly connected to disk 17, there is provided an elastic or other suitable plate for securing a tight closure of the mouth of the tube. For the purpose of disengaging this device the casing 8 (respectively point 22 of the casing) must be moved as indicated in Fig. 5. Engagement is effected by reverse motion.

In Fig. 7 the new device is shown as adapted for securing hooks or other objects in a wall or the like, the device having, as it were, the function of a dowel. The chief difference between this construction and the foregoing is that casing 8 and sleeve 7, firmly connected to said casing, together with spring 3 and ring 10, are secured in a wall and remain fixed in their position, so that the bolt 1 for the purpose of being detached must be moved reversely to diagram Fig. 5 and in order to be engaged in the same direction as represented in Fig. 5.

The described device may undergo several modifications without departing from the object of this invention. For instance, the rests 6 may be dispensed with without materially altering the function of the device.

What I claim, and desire to secure by Letters Patent, is—

1. A fastening device having two sets of bayonet-slots, one set being arranged in a central body, the other set being provided in a sleeve surrounding said central body, a corresponding set of noses provided on a ring slidingly arranged on the surrounding sleeve, each of said noses entering one slot in the surrounding sleeve and one corresponding slot in the central body, a spring arranged on the surrounding sleeve and engaging the said ring substantially as and for the purpose described.

2. A fastening device having two sets of bayonet-slots, one set being arranged in a central body, the other set being provided in a sleeve surrounding said central body, a corresponding set of noses provided on a ring slidingly arranged on the surrounding sleeve, each of said noses entering one slot in the surrounding sleeve and one corresponding slot in the central body, a spring arranged on the surrounding sleeve and engaging the said ring, a casing fixed to an outwardly-extending disk of the said surrounding sleeve substantially as and for the purpose described.

In witness whereof I subscribe my signature in presence of two witnesses.

PETER KLEBER.

Witnesses:
 JEAN GRUND,
 CARL GRUND.